Figure 1:
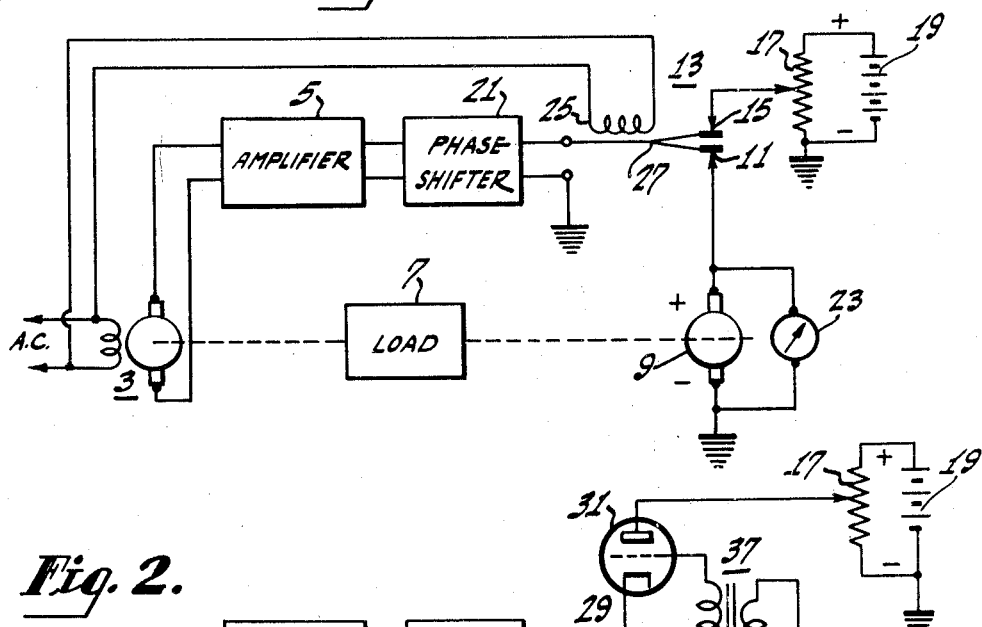

Oct. 11, 1949. H. E. HAYNES 2,484,089
MOTOR SPEED CONTROL
Filed Dec. 31, 1946

INVENTOR
*Harold E. Haynes*
BY
ATTORNEY

Patented Oct. 11, 1949

2,484,089

UNITED STATES PATENT OFFICE 2,484,089

MOTOR SPEED CONTROL

Harold E. Haynes, Audubon, N. J., assignor to Radio Corporation of America, a corporation of Delaware Application December 31, 1946, Serial No. 719,565

8 Claims. (Cl. 318—317)

This invention relates to electric control systems for maintaining the speed of a motor at a constant predetermined value.

In many industrial applications it is desirable to drive a load or output device at a constant speed by means of an electric motor. An example of such a system which has particular application to the present invention is the driving of a phonograph turntable in electrical reproducing systems. As is well known, the frequency of the reproduced sound is a function of the speed of rotation of the record and thus of the turntable. For high fidelity it is essential that the speed of rotation be maintained at an absolutely constant value. It is also known that the pickup device when placed on the record presents substantial frictional load to the motor and that this varies in accordance with the nature and amplitude of the recorded sound track.

Speed variations may, to a certain extent, be eliminated by making the turntable of sufficient mass so as to hold its rotational speed relatively constant due to its inertia. However, this is insufficient to maintain the speed at the constancy desired, particularly in cases where the pickup device is lifted from the record groove to interrupt the playing and then replaced in the same groove when playing is to be resumed. This practice is common in the broadcast art, where, for example, sound effect records are employed and a particular portion of the recorded material is to be reproduced so that it is necessary to lower the needle to a prescribed groove in the record at such a point that reproduction commences instantly. The sudden increase of frictional load necessarily slows the motor down to a slight extent. This may largely be overcome if the speed is regulated so that when the load is removed the speed remains at the constant predetermined value.

Speed control systems have heretofore been suggested in which the amplitude of the driving current is controlled in accordance with a voltage representative of the speed of the motor. For example, such a system is described in U. S. Patent No. 2,235,551 of March 18, 1941. While such a system will increase the energizing current to the motor when the motor speed tends to fall below the desired value and to decrease the energizing current when the motor speed tends to increase above the desired value, it has been found that when the frictional load is removed, as when the pickup device is lifted off the record, it is not sufficient merely to reduce the amplitude of the applied current since the inertia of the turntable will cause it to continue to rotate at substantially the same speed for a considerable period of time. Even if the energizing current is reduced to zero, the control will still be ineffective to slow down the motor sufficiently rapidly to provide the degree of accuracy which is necessary; the greater the inertia of the turntable the less effective will be such systems of speed control.

It is therefore the primary object of this invention to provide a new and improved motor speed control system.

A further object of this invention is to provide a motor speed control system in which a reversing torque is applied to the motor to effectively reduce its speed when the removal of the friction load tends to cause the speed to increase.

A still further object of this invention is to provide a speed control system for an alternating current motor which utilizes a minimum number of tubes and other elements which tend to increase the bulk and complexity of the apparatus.

In accordance with the present invention, the speed of the motor is measured by means of a small D. C. voltage generator the output of which is compared to a voltage the amplitude of which may readily be adjusted to control the speed. The difference between these two voltages is used to generate an alternating current whose phase and amplitude are determined by the variation of the motor speed from the desired value. This current is utilized to energize the motor in such a manner that a reverse torque is applied to reduce the speed of the motor when it tends to accelerate and to increase the excitation of the motor when it tends to decelerate.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Figure 1 is a schematic diagram of a preferred embodiment of this invention, and Figure 2 is a schematic diagram of an alternative embodiment.

Figure 2:
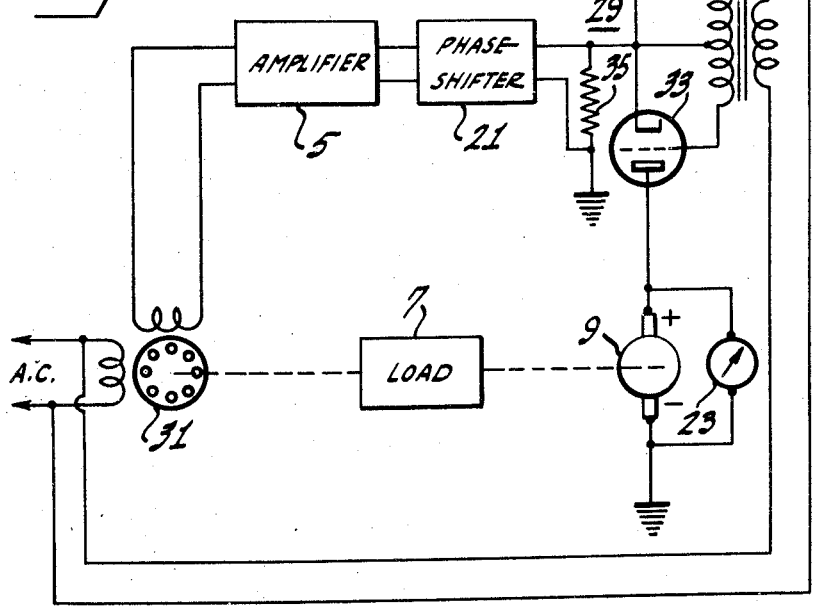

Referring to Fig. 1, the motor 3 is of the well-known type having a fixed field winding adapted to be energized by a fixed alternating current and an armature winding adapted to be energized by a second alternating current. The field winding is preferably connected directly to the 60 cycle commercial line and therefore constitutes a reference voltage.

The armature is energized by means of an alternating current which is produced by an amplifier 5 and which varies in phase and amplitude in accordance with deviations of the motor from the desired speed, as will be pointed out below. It is to be understood, however, that these connections may be reversed and the control current developed by the amplifier may be applied to the field winding and the line current applied to the armature.

The motor is used to drive a load 7 which may be, for example, the turntable of a phonograph reproducer as noted above. It is assumed that this load must be driven at a constant speed and that it presents to the motor a friction load which varies from time to time due to the drag of the pick-up and inherent frictional irregularities in the drive system. The motor shaft also drives a small permanent field D. C. generator or tachometer 9, suitable for producing an output voltage of the order of 10 volts D. C., although this value is not critical. One terminal of the D. C. generator 9 is connected to one contact 11 of a relay device 13, the other terminal being grounded. The other terminal 15 of the relay is connected to the movable arm of a potentiometer 17 across which is connected a source of fixed D. C. potential such as a battery 19, the negative terminal of which is grounded. The armature of relay 13 is connected to the input of a phase shifter 21, the other input terminal being connected to ground. The output of the phase shifter is connected to the input of the amplifier 5, the output of which, as stated above, is connected to the motor 3. A voltmeter 23 may be connected across the D. C. generator 9 and calibrated in terms of motor speed and thus serve as a convenient indicator of the actual speed of the motor.

The relay 13 is driven synchronously with the line voltage by means of an energizing coil 25 which is connected to the source of line voltage and which causes the armature 27 to vibrate between the two contact points 11 and 15 in synchronism with the line frequency. The relay is preferably of the type in which the armature contacts one of the contact elements 11 or 15 before the connection to the other contact has been broken. This may be accomplished, as is well known, by using, for example, a split armature in which two contact points are mounted on spring elements and positioned slightly apart so that contact is established on the "make" side before the contact is broken on the "break" side.

Since for motors of the types contemplated, it is necessary to establish a predetermined phasal relationship between the two energizing alternating currents, depending on the type of motor, a phase shifter 21 has been included in the circuit to insure rotation of the motor. However, it is to be understood that the actual phase shift may be accomplished in the amplifier 5, since it is well known that there is usually a phase shift between the input and output of an amplifier, and this can be controlled by suitable design.

The function of relay 13 is to produce an alternating voltage of a given phase when the amplitude of the reference voltage derived from potentiometer 17 exceeds the D. C. control voltage produced by generator 9 and of opposite phase when the D. C. control voltage exceeds the amplitude of the reference voltage. The manner in which this is accomplished may be seen by considering the normal adjustment of the device in which the amplitude of the reference voltage is slightly greater than the amplitude of the control voltage. In this case it will be seen that an essentially square wave voltage will be applied to the input of the phase shifter 21 which will be most positive during successive time cycles when armature 27 of the relay 13 makes connection with contact 15. Since the relay is synchronously operated with the line voltage it may therefore be said that the positive half of the square wave voltage which is applied to the phase shifter, and thus to the amplifier, coincides with the positive half cycle of the line voltage. On the other hand, if the motor speed increases, the voltage produced by generator 9 will exceed the amplitude of the reference voltage and the positive half cycle of the square wave which is applied to the phase shifter will occur when the armature 27 makes connection with contact 11. This connection is made a half cycle later than the connection to contact 15, and it will therefore be seen that the phase of the square wave voltage produced by the relay is determined by the relative amplitudes of the two D. C. voltages, one of which is proportional to the speed of rotation. Consequently, the phase of the square wave voltage is a function of the speed of rotation of the motor. It may also be seen that the amplitude of the square wave voltage bears a direct relation to the difference in potential between the amplitudes of control voltage and the reference voltage.

Amplifier 5 is any conventional A. C. amplifier having sufficient gain to convert the small square wave alternating voltage into a corresponding alternating current of sufficient amplitude to provide the necessary torque to drive the motor the desired speed under the known load conditions, with sufficient reserve to accomplish the desired control. The sensitivity of control is largely dependent upon the amplification of the amplifier, and it should therefore be large. In a practical case the gain of the amplifier should be sufficient so that a substantial increase in torque is produced when the amplitude of the square wave voltage applied to the phase shifter is approximately .05 volt.

Assuming that the motor is rotating at the desired speed, as determined by the setting of potentiometer 17, and that the reproducing device is lifted off the record, this reduction of the frictional load on the motor will cause the motor to tend to increase in speed. Any such increase, however, is immediately reflected by an increase in the voltage produced by generator 9. If the increase is sufficiently small the effect will be first to reduce the differential between the control voltage and the reference voltage, and thus reduce the amplitude of the driving current tending to cause the motor to slow down. If, however, the device is made sufficiently sensitive, the increase in control voltage will be sufficiently great that its amplitude will exceed that of the reference voltage. This causes the phase of the square wave voltage applied to the amplifier to reverse. As a result, the phase of the alternating current applied by the amplifier to the motor is likewise reversed. As is well known, the reversal in phase of the energizing current causes a reverse torque to be applied to the motor, thus effectively and positively reducing its speed until the condition of balance has been reestablished and the normal speed of operation restored. When the pickup arm is again placed on the record the tendency of the motor to slow down in view of the increased frictional load immediately reduces the output of the generator 9, increasing the amplitude of the alternating voltage applied to the amplifier and effectively increasing the amplitude of the energizing current supplied to the motor. This increases the driving torque and compensates for the increased load.

An alternate embodiment is shown in Fig. 2 in which the functions of the mechanical relay 13 are accomplished by an electronic relay 29. All other portions of the circuit are the same except that an alternative form of induction motor 31 has been illustrated.

In this case motor 31, as is well known, is provided with separate field windings which are energized by alternating currents in phase quadrature. As in the case of the type of motor illustrated in Fig. 1, reversing the phase of the current applied to either winding reverses the direction of rotation. The principle of operation is the same as that described about and need not be explained further.

The electronic relay 29 comprises two thermionic triodes 31 and 32, the plate of one being connected to the source of D. C. reference potential and the plate, the other being connected to the generator 9. The cathodes are connected together and through a load resistor 35 to ground. The input of the phase shifter 21 is connected between ground and the common cathode connection. The two grids are connected to the outer terminals of the secondary of a push-pull transformer 37, the primary of which is connected to the A. C. line.

It will be observed that the grid electrodes of the two tubes 31 and 33 are driven in phase opposition at line frequency and that the tubes therefore become conductive alternately. During the half cycle when tube 31 is conducting the cathodes assume a positive potential which is determined largely by the amplitude of the reference voltage produced by potentiometer 17. During the other half cycle the cathodes assume a potential which is determined largely by the amplitude of the control voltage developed by the generator 9. As a result, the phase of the resultant alternating voltage which is applied to the phase shifter depends upon the relative amplitude of the control and reference voltages, as in the preceding case. This voltage is adjusted in phase and amplified as before, and the resultant current used to energize one winding of the induction motor 31.

There has thus been described a speed control system wherein a reversible motor which is subject to undesirable speed variations from changes in its applied load is controlled by means of a control voltage which is proportional to the speed of rotation of the motor, the control voltage being compared to a reference voltage of predeterminable amplitude to produce an alternating voltage whose phase and amplitude are a function of the deviation in the speed of the motor from a desired value.

What I claim is:

1. The combination comprising a reversible motor subject to undesirable speed variations resulting from changes in its applied load; a D. C. generator coupled to said motor for developing a control voltage proportional to the speed of said motor; means for producing a reference voltage of a magnitude corresponding to the speed at which said motor is to drive said load; means for producing an alternating voltage of a given phase when said reference voltage exceeds said control voltage and of opposite phase when said control voltage exceeds said reference voltage; and means for utilizing said alternating voltage to drive said motor.

2. The combination comprising a reversible motor of the type adapted to be energized by separate alternating currents whose relative phase determines the direction of the resultant rotational torque, said motor being subject to undesirable speed variations resulting from changes in its applied load; means for developing a control voltage proportional to the speed of said motor; means for producing a reference voltage of a magnitude corresponding to the speed at which said motor is to drive said load; means for producing a first alternating current having a given phase when said reference voltage exceeds said control voltage and of opposite phase when said control voltage exceeds said reference voltage; means for applying said first alternating current to said motor; and means for applying a second alternating current of fixed phase to said motor.

3. The combination comprising a reversible motor of the type adapted to be energized by separate alternating currents whose relative phase determines the direction of the resultant rotational torque, said motor being subject to undesirable speed variations resulting from changes in its applied load; means for developing a D. C. control voltage proportional in amplitude to the speed of said motor; means for producing a D. C. reference voltage whose amplitude exceeds the amplitude of said control voltage at the desired speed of operation of said motor; means for producing a first alternating current having a given phase when said reference voltage exceeds said control voltage and of opposite phase when said control voltage exceeds said reference voltage; means for applying said first alternating current to said motor; and means for applying a second alternating current of fixed phase to said motor.

4. The combination comprising a reversible motor of the type adapted to be energized by separate alternating currents whose relative phase determines the direction of the resultant rotational torque, said motor being subject to undesirable speed variations resulting from changes in its applied load; means for developing a D. C. control voltage proportional in amplitude to the speed of said motor; means for producing a D. C. reference voltage whose amplitude exceeds the amplitude of said control voltage at the desired speed of operation of said motor; means for producing an alternating voltage having a given phase when said reference voltage exceeds said control voltage and of opposite phase when said control voltage exceeds said reference voltage; means for amplifying said alternating voltage to produce a first alternating current; means for applying said first alternating current to said motor; and means for applying a second alternating current of fixed phase to said motor.

5. A device of the character described in claim 4 in which said means for producing an alternating voltage includes relay means for alternately applying said control and reference voltages to the input of said amplifier at a rate equal to the frequency of said second alternating current.

6. A device of the character described in claim 4 in which said means for producing an alternating voltage includes a single-throw double-pole relay for alternately applying said control and reference voltages to the input of said amplifier at a rate equal to the frequency of said second alternating current.

7. The combination comprising a reversible A. C. motor of the type adapted to be energized by separate alternating currents whose relative phase determines the direction of the resultant rotational torque, said motor having a relatively high inertia and a variable friction load which tends to produce undesirable speed variations; first and second alternating current sources; means for applying the currents from said first and second alternating current sources respectively to energize said motor; means for developing a D. C. voltage whose amplitude is proportional to the speed of said motor, and control means for applying said D. C. voltage to said first source to control the amplitude and phase of the alternating currents of said first source to apply a resultant rotational torque to reduce the speed of said motor when the speed thereof tends to exceed a predetermined value.

8. A device of the character described in claim 7 wherein said control means includes a reference D. C. voltage generator, and means for cyclically comparing the amplitudes of said D. C. voltage and said reference D. C. voltage to produce an alternating voltage whose phase depends upon the relative amplitudes of said D. C. voltages, said first source comprising said comparison means and said D. C. generator and reference voltage.

HAROLD E. HAYNES.

REFERENCES CITED

The following references are of record in the file of this patent:

UNITED STATES PATENTS

| Number | Name | Date |
| --- | --- | --- |
| 2,113,164 | Williams | Apr. 5, 1938 |
| 2,115,086 | Riggs | Apr. 26, 1938 |
| 2,150,006 | Parker et al. | Mar. 7, 1939 |